United States Patent
Klares et al.

(10) Patent No.: US 11,620,810 B2
(45) Date of Patent: Apr. 4, 2023

(54) IDENTIFICATION OF DROPLET FORMATION DURING CABLE BURN TESTING

(71) Applicant: CORNING RESEARCH & DEVELOPMENT CORPORATION, Corning, NY (US)

(72) Inventors: Robert Klares, Berlin (DE); Kirsten Langfeld, Berlin (DE); Thomas Meyer, Berlin (DE); Waldemar Stöcklein, Coburg (DE); Uwe Zymnossek, Frankfurt (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/523,170

(22) Filed: Nov. 10, 2021

(65) Prior Publication Data
US 2022/0164591 A1    May 26, 2022

Related U.S. Application Data

(60) Provisional application No. 63/117,099, filed on Nov. 23, 2020.

(51) Int. Cl.
*G06V 10/75* (2022.01)
*G01M 11/08* (2006.01)
(Continued)

(52) U.S. Cl.
CPC ......... *G06V 10/751* (2022.01); *G01M 11/088* (2013.01); *G06K 9/6218* (2013.01);
(Continued)

(58) Field of Classification Search
None
See application file for complete search history.

(56) References Cited

U.S. PATENT DOCUMENTS

| 5,917,540 A * | 6/1999 | Buch | G11B 27/34 |
| | | | 348/86 |
| 6,184,792 B1 * | 2/2001 | Privalov | G08B 17/125 |
| | | | 700/274 |

(Continued)

FOREIGN PATENT DOCUMENTS

WO    2019/206412 A1    10/2019

OTHER PUBLICATIONS

European Patent Application No. 21207692.1, Extended European search report, dated Apr. 20, 2022; 12 pages; European Patent Office.

(Continued)

*Primary Examiner* — Hung Q Dang
(74) *Attorney, Agent, or Firm* — William D. Doyle

(57) ABSTRACT

A system (100) for the identification of the formation of a burning droplet (9) of a material of a fiber optic cable (3) during cable burn testing comprises a data processing device (11) for processing respective image data of a plurality of image samples of an image stream. The data processing device (11) is configured to execute at least a processing step of preprocessing each of the recorded image samples of the image stream to generate a respective preprocessed image sample for each of the recorded image samples such that areas of the recorded image samples disturbing the identification of burning droplets (9) are masked out in the respective preprocessed image sample, and a step of identifying a burning droplet (9) in each of the preprocessed image samples by evaluating a pixel color property of a pixel of each preprocessed image sample.

15 Claims, 3 Drawing Sheets

(51) Int. Cl.
  *G06K 9/62* (2022.01)
  *G06T 7/20* (2017.01)
  *G06V 10/22* (2022.01)
  *H04N 5/76* (2006.01)
  *G06V 10/26* (2022.01)
  *G06V 10/762* (2022.01)
  *G06V 20/52* (2022.01)
  *G06V 10/56* (2022.01)
  *H04N 5/232* (2006.01)

(52) U.S. Cl.
  CPC ............... *G06T 7/20* (2013.01); *G06V 10/22* (2022.01); *H04N 5/23229* (2013.01); *H04N 5/76* (2013.01)

(56) References Cited

U.S. PATENT DOCUMENTS

| | | | |
|---|---|---|---|
| 2009/0015837 A1* | 1/2009 | Behrendt | G01M 99/002 356/417 |
| 2011/0085030 A1* | 4/2011 | Poe | F23G 7/085 382/103 |
| 2018/0266680 A1* | 9/2018 | Arabi | G05B 23/024 |
| 2021/0217177 A1* | 7/2021 | Li | G16B 35/00 |

OTHER PUBLICATIONS

He Hao, et al, "Molten thermoplastic dripping behavior induced by flame spread over wire insulation under overload currents", Journal of Hazardous Materials, Elsevier, Amsterdam, NL, vol. 320, Jul. 2016, pp. 628-634.

Kobayashi, et al, "Flame spread over horizontal and vertical wires: The role of dripping and core", Fire Safety Journal, vol. 91, Jul. 2017, pp. 112-122.

Manish M, et al, "Optical characterization of droplet clusters and group combustion in spray diffusion flames", Proceedings of the Combustion Institute, vol. 38, No. 2, Oct. 2020, pp. 3409-3416.

Zeki Hakan, "Mise en service d'un laboratoire d'essais incendies pour cables. Creation d'un programme pour base de donnees en VBA", Jul. 2011, pp. 152.

Celik et al., "Computer Vision Based Fire Detection in Color Images", IEEE Conference on Soft Computing in Industrial Applications, 2008, 6 pages.

Toreyin et al., "Computer vision based method for real-time fire and flame detection", Pattern Recognition Letters, vol. 27, 2006, pp. 49-58.

\* cited by examiner

IDENTIFICATION OF DROPLET FORMATION DURING CABLE BURN TESTING

CROSS-REFERENCE TO RELATED APPLICATIONS

This application claims the benefit of priority of U.S. Provisional Application Ser. No. 63/117,099 filed on Nov. 23, 2020, the content of which is relied upon and incorporated herein by reference in its entirety.

BACKGROUND

The disclosure relates to a system for the identification of the formation of a flaming droplet of a material of a fiber optic cable during cable burn testing.

Fiber optic cables to be used for permanent installation in construction works need to be tested according to the Construction Product Regulation (Standard EN 50399). The classification into so-called Euro-Classes is done according to the standard EN 13501-6. The classification covers a range from F to A, wherein F means worst burn performance, and A indicates best burn performance. In addition to the main classes A to F, subclasses a, s and d are used to classify acidity (a0, a1, a2), smoke density (s1a, s1b, s2, s3) and formation of burning droplets (d0, d1, d2).

Burning droplets of a fiber optic cable typically contain pieces of jacket material of the fiber optic cable which has melted because of the heat generated by the burn process and thus drip down, or other particles released from the cable. Class "d0" implies "no droplets at all". Class "d1" allows for the occurrence of droplets burning no longer than 10 seconds, and "d2" means "droplets identified which burn longer than 10 seconds".

To classify a fiber optic cable into the different classes, a burn test is usually performed in which a fiber optic cable is set on fire in a burn chamber. The formation of burning droplets of the material of the fiber optic cable under test is usually monitored by an operator who has to watch the burn process for at least 20 minutes, which is the usual time for one experiment. The operator has to carefully watch if burning droplets of the material of the fiber optic cable have been generated and have fallen down on the floor of the burn chamber, and if these droplets burn longer than 10 seconds (class "d2") or less than 10 seconds (class "d1"). This is a task which needs lots of concentration and discipline. It is therefore not surprising that the judgement of the duration of the burn is often prone to failure.

There is a desire to provide a system for the identification of the formation of a burning droplet of a material of a fiber optic cable during cable burn testing which allows to automatically run the detection of burning droplets with high precision.

SUMMARY

A system for the identification of the formation of a burning droplet of a material of a fiber optic cable during cable burn testing which runs automatically and allows reliable identification of burning droplets of the material of the fiber optic cable is specified in claim 1. The system for the identification of the formation of a burning droplet of a material of a fiber optic cable comprises a data processing device for processing respective image data of a plurality of image samples of an image stream. The data processing device is configured to execute at least the following processing steps a) and b). In the processing step a), each of the recorded image samples of the image stream is preprocessed by the data processing device to generate a respective preprocessed image sample for each of the recorded image samples such that areas of the recorded image samples disturbing the identification of burning droplets are masked out in the respective preprocessed image sample. In the processing step b), a burning droplet is identified in each of the preprocessed image samples by evaluating a pixel color property of a pixel of each preprocessed image sample.

The system may comprise a video camera for recording the image stream. The video camera may be mounted on a burn chamber in such a way that the video camera can record the burning process of a fiber optic cable placed in the burn chamber. The image stream provided by the video camera can be transferred to the data processing device to be processed according to processing steps a) and b).

The data processing device may be configured to execute a step of determining and tracking a burning region in each preprocessed image sample. The data processing device may be further configured to measure the time during which a specific burning droplet can be tracked in the tracked burning regions. As a result, the data processing device may provide information about the burning time of an identified burning droplet. The system for the identification of the formation of a burning droplet of a material of a fiber optic cable during cable burn testing may thus be used as a monitoring system which enables the evaluation of the fiber optic cable regarding the classification in classes "d0", "d1", and "d2" without any operator involvement during a burn test according to EN 50399.

In particular, the system is configured as an automatic video system which allows to record the burn process of the fiber optic cable, and to analyze the burn pattern for the formation of burning droplets. When burning droplets are identified by the data processing device, the duration of burn of each individual droplet can be evaluated and recorded. At the end of the burn process, for example after 20 minutes, a list of all burning "events" and the final "d-class" rating of the fiber optic cable are provided.

Additional features and advantages of the system for the identification of the formation of a burning droplet of a material of a fiber optic cable during cable burn testing are set forth in the detailed description that follows. It is to be understood that both the foregoing general description and the following detailed description are merely exemplary, and are intended to provide an overview or framework for understanding the nature and character of the claims.

BRIEF DESCRIPTION OF THE DRAWINGS

The accompanying drawings are included to provide further understanding, and are incorporated in, and constitute a part of, the specification. As such, the disclosure will be more fully understood from the following detailed description, taken in conjunction with the accompanying figures in which.

DETAILED DESCRIPTION

Figure 1:
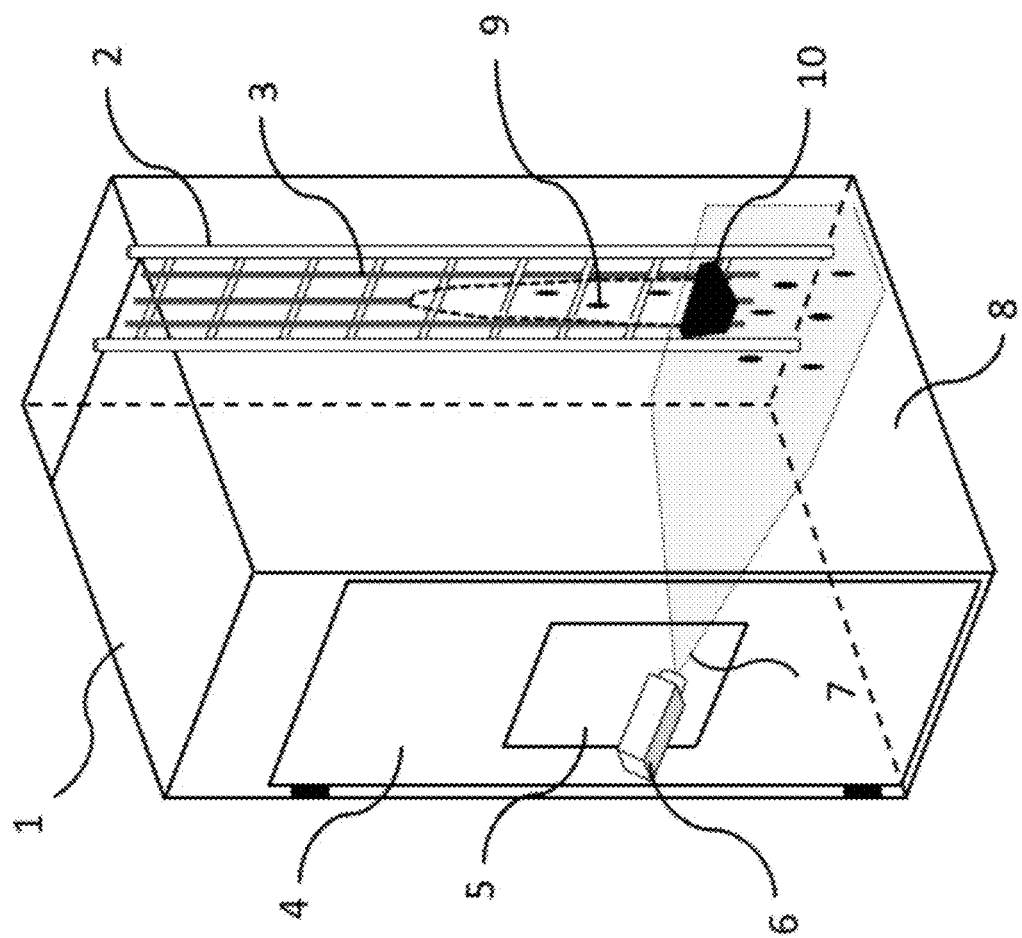
FIG. 1 shows an embodiment of a system for the identification of the formation of a burning droplet of a material of a fiber optic cable during cable burn testing comprising a burn chamber, a video camera for recording an image stream of the burn process, and a data processing device for processing the image stream.

FIG. 1 shows an embodiment of a system 100 for the identification of the formation of a burning droplet of a material of a fiber optic cable during cable burn testing which comprises a data processing device 11 for processing respective image data of a plurality of image samples of an image stream. The data processing device 11 is configured to execute a processing step in which each of the recorded image samples of the image stream is preprocessed to generate a respective preprocessed image sample for each of the recorded image samples such that areas of the recorded image samples disturbing the identification of burning droplets of a material of a fiber optic cable are masked out in the respective preprocessed image sample. The data processing device 11 is further configured to execute a processing step of identifying a burning droplet of the material of the fiber optic cable in each of the preprocessed image samples by evaluating a pixel color property of a pixel of each preprocessed image sample.

The pixel color property is a characteristic value defining the color of a pixel, for example, the brightness of a pixel, the color hue and/or the color temperature of the pixel.

The system 100 for the identification of the formation of a burning droplet 9 of a material of a fiber optic cable during cable burn testing shown in FIG. 1 comprises a burn chamber 1 in which at least one fiber optic cable 3 may be placed for burn testing. The system 100 comprises a supporting device 2 which may be configured as a ladder for supporting the at least one fiber optic cable 3, and which is arranged in the burn chamber 1. The system 100 further comprises a burner 10 being arranged in the burn chamber 1 at a distance above a bottom 8 of the chamber. The burner 10 is configured to produce a flame which is suitable for igniting the at least one fiber optic cable 3. The burn chamber 1 has a window 5 to inspect the inside of the burn chamber 1. The window 5 may be arranged in a front door 4 of the burn chamber.

The system 100 comprises a video camera 6 for recording an image stream. The video camera 6 is mounted on the burn chamber 1, for example to the front door 4, for recording the image stream showing the inside of the burn chamber 1, particularly a burning process of the fiber optic cable 3 during cable burn testing.

Figure 2:
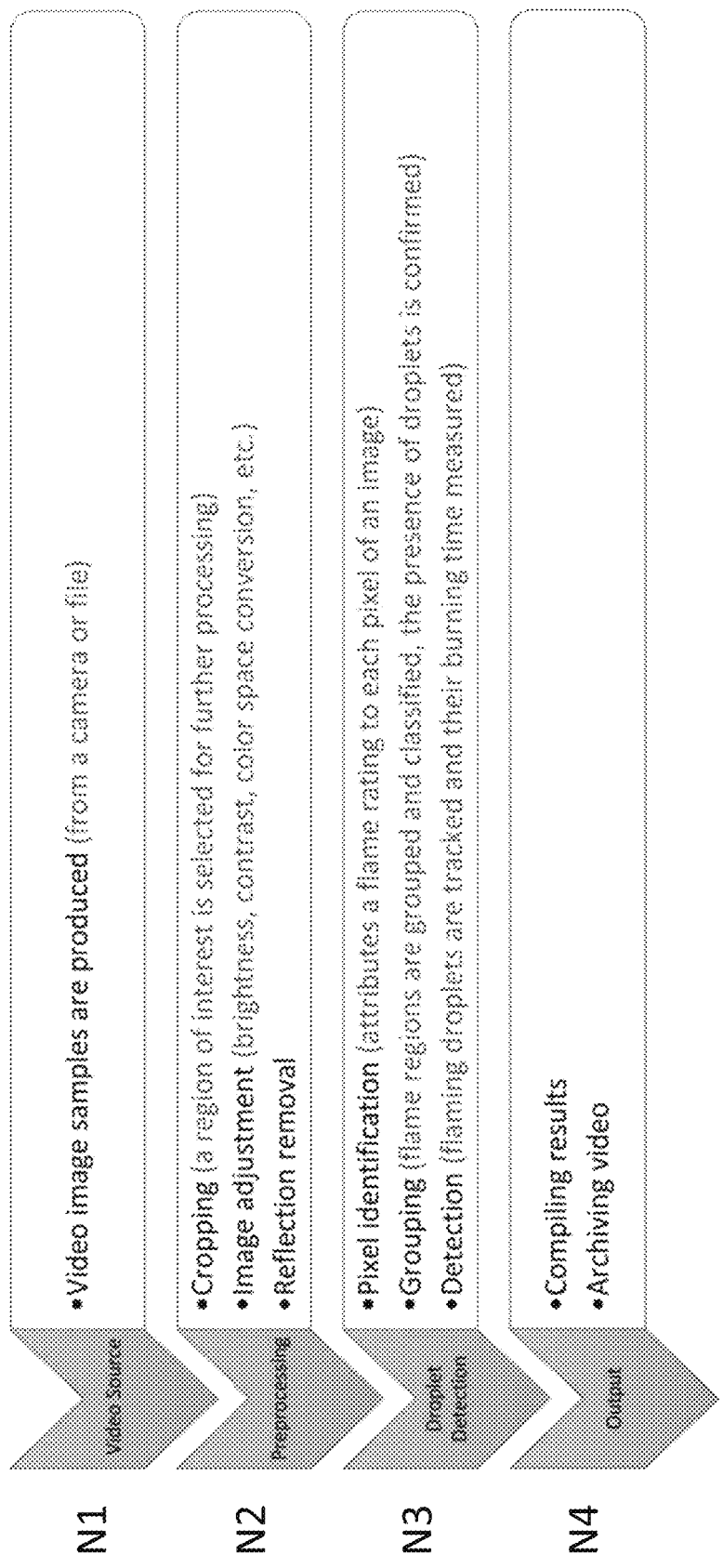
FIG. 2 illustrates a video processing graph including processing steps to be executed by a data processing device of the system.

FIG. 2 shows a video processing graph illustrating the various processing steps to be executed by the data processing device 11 for identifying the formation of a burning droplet 9 of a material of a fiber optic cable during cable burn testing. The processing steps may be part of a program implemented as a video processing application, wherein the structure of the program is completely modular and built around nodes N that enforce a directed flow of image data through the different processing stages. Those processing nodes can generate, modify, evaluate and output image data.

The graph's nodes N1, N2, N3 and N4 shown in FIG. 2 can take multiple roles and exert different behaviours depending on how they are interconnected to each other, and how they were set up. A nodes' role and behaviour are dictated by a video processor unit of the data processing device that is assigned to it.

The various processing steps executed by the data processing device 11 are explained in the following with reference to the system shown in FIG. 1 and the processing nodes N1, N2, N3 and N4 shown in the video processing graph of FIG. 2.

In processing node/step S1 video image samples of the image stream showing the burning process of a fiber optic cable in the burn chamber 1 are produced. Depending on configuration, the image stream of video image samples is produced from either a camera or a file source. For the best image quality, an industrial grade network camera with GigE vision support may be used.

FIG. 1 shows producing or recording an image stream of a burning process of fiber optic cables 3 in the inside of the burn chamber 1 by means of the video camera 6. In this case, the image stream that is processed later by the data processing device 11 is provided from the video camera 6.

According to another possible embodiment, previously recorded image samples of an image stream showing a burning process of a fiber optic cable in the inside of the burn chamber 1 are stored in a file which can later be used as a source for providing the image samples of the image stream to be processed by the data processing device 11.

Before any reliable video analysis can be performed, the video signal, i.e. the recorded image data of the image samples of the image stream are preprocessed in processing node/processing step N2 by the data processing device 11. For this purpose, data processing device 11 performs normalization and filtering operations of the recorded image data of the image samples of the image stream.

A first sub-step executed in processing node/preprocessing step N2 is to crop out a region of interest from the image data of the recorded image samples showing viewing section 7. For this purpose, the data processing device 11 is configured to execute a step of cropping out a region from the viewing section 7, wherein the cropped-out region is located above the bottom 8 of the burn chamber 1 and below the burner 10 in each of the recorded image samples for later processing the image data of the cropped-out region.

According to a preferred embodiment, the cropped-out region of interest is near the floor and below the burner's main flame, to exclude any image regions that are not relevant for the later droplet detection process shown in processing node N3.

Moreover, normalization and filtering operations performed in processing node N2 comprise an image adjustment of the recorded image samples of the image stream. During image adjustment data processing device 11 adjusts brightness and contrast of the recorded image samples, performs color space conversion, etc.

Furthermore, in preprocessing step N2, the fact is taken into account that any reflective surfaces in the burn chamber 1 are susceptible to show stable specular highlights of the same color as the main flame they were produced by, thus causing several false positives. The data processing device 11 is configured to execute in processing node N2 a step of masking out a reflection in the recorded image samples.

The reflection is caused by the flame of the burner 10 or a reflective surface in the inside of the burn chamber 1. These reflections disturbing the later processing steps of droplet detection and image sample evaluation are masked out in the video stream in step N2 before the preprocessed image samples are further processed in step N3 for droplet detection.

With this purpose, video footage towards the start of the cable burn test is used to generate a baseline image that serves as reference or bias when identify burning droplets in the video stream. In particular, the baseline image is generated between the time during flame stabilization in the burn chamber until the earliest possible occurrence of burning droplets. This baseline image is then subtracted by the data processing device 11 from a recorded image including burning droplets of the fiber optic cable.

In conclusion, the use of the baseline image by data processing device 11 allows to obtain information about brightness and reflections produced by the main flame of the burner 10 which has to be deducted from the recorded image samples to obtain preprocessed/filtered image samples to be analysed in later processing steps N3 and N4.

Droplet detection performed by the data processing device 11 in processing node N3 happens in three steps.

The first step comprises the identification of all image pixels in the preprocessed image samples that show flames, sparks, or incandescent glow. In particular, a rule-based function may be applied to each image pixel's color value to rate pixels on how likely they show parts of a flame. The resulting image may be a grayscale mask with pixel brightness indicating the flame rating. The classification system for attributing flame ratings is configured to be highly modular and several other algorithms and functions may be implemented. The color hue and/or the color temperature of a pixel, for example, may be used to define the pixel color property which may serve as criterions for the classification of the flame ratings.

In order to execute the first step of droplet detection in processing node N3, the data processing device 11 is configured to execute a processing step of evaluating each pixel of each preprocessed image sample of the image stream to determine if the evaluated pixel shows a part of the burning droplet.

The data processing device 11 may be configured to execute the step of evaluating each pixel of each preprocessed image sample by a processing step of creating an image for each preprocessed image sample, wherein the created image is a grayscale mask. That means that each pixel of the created image/grayscale mask has a specific brightness value that may be used to indicate a flame rating of said pixel.

The data processing device 11 is configured to execute the step of assigning a respective flame rating value to each pixel. According to a possible embodiment, the data processing device 11 may be configured to assign a respective flame rating value to each pixel of the created image of the grayscale mask in response to a respective brightness value of a pixel.

The second step performed by the data processing device 11 in processing node N3 comprises the classification and grouping of all pixels whose flame rating exceeds a specific threshold so that the presence of burning droplets in the recorded image may be confirmed. Pixels are first classified and thus identified as being part of a flaming region, and then grouped into regions. This allows the identification and the measurement of the size, intensity, and boundaries of each flaming region in each image sample.

In order to perform the processing steps of classifying and grouping of the pixels in processing node/step N3, the data processing device 11 is configured to execute the step of classifying each pixel whose flame rating value exceeds a threshold as showing the part of the burning droplet.

Furthermore, the data processing device 11 is configured to execute the step of grouping pixels by using a clustering algorithm. According to a possible embodiment, pixels adjacent to the pixel being classified as showing the part of the burning droplet, when the flame rating value of the respective adjacent pixel exceeds the threshold.

Grouping may be done by the data processing device 11 using a generic clustering algorithm such as "DBScan". Another clustering algorithm that may be supported is "k-means". Due to the modular character of the system, several of such clustering algorithms may be implemented.

In conclusion, the second step performed in processing node N3 of the video processing graph allows to attribute a "d1" classification for the burn test, if any burning droplets have been determined in the recorded image samples with a burn time of less than 10 seconds, according to the EN 50399 standard.

According to a possible embodiment, the data processing device 11 is configured to execute a step of determining a burning region in each preprocessed image sample based on the grouped pixels and tracking the burning regions.

The third step of droplet detection performed by the data processing device 11 in processing node N3 allows to measure the burn time of each flaming droplet. For this purpose, once a burning droplet is detected by the data processing device 11, it is continuously identified by the data processing device 11 over the course of multiple image samples in the video stream. This is done by tracking the detected particles over time and by recognizing how said particles from a new frame line up with those of a previous frame. An assignment is done by matching particles from subsequent image frames based on their size and position.

In order to perform the third step of droplet detection in processing node N3, the data processing device 11 is configured to execute a processing step of tracking a burning droplet in the tracked burning regions. Furthermore, the data processing device 11 is configured to execute a processing step of measuring the time during which the burning droplet is tracked in the tracked burning regions. Moreover, the data processing device 11 is configured to execute a processing step of attributing a class designation to the fiber optic cable in dependence on the measured burn time.

As a result of the third step of droplet detection in processing node N3, the data processing device 11 attributes a "d2" classification to the fiber optic cable for the burn test, if any flaming droplets have been determined during the burn test with a burn time larger than 10 seconds, according to the EN 50399 standard.

After detection and processing, the video stream recorded during the burn test can be displayed to a user or encoded and archived which is indicated in processing node N4 of the video processing graph of FIG. 2. The test results will be compiled and may be written to file alongside the video file showing the burning process in the burn chamber.

A video processing app to execute the various processing steps assigned to the processing nodes N1, N2, N3 and N4 can be run as a desktop app with console or window output in the data processing device 11.

Figure 3:
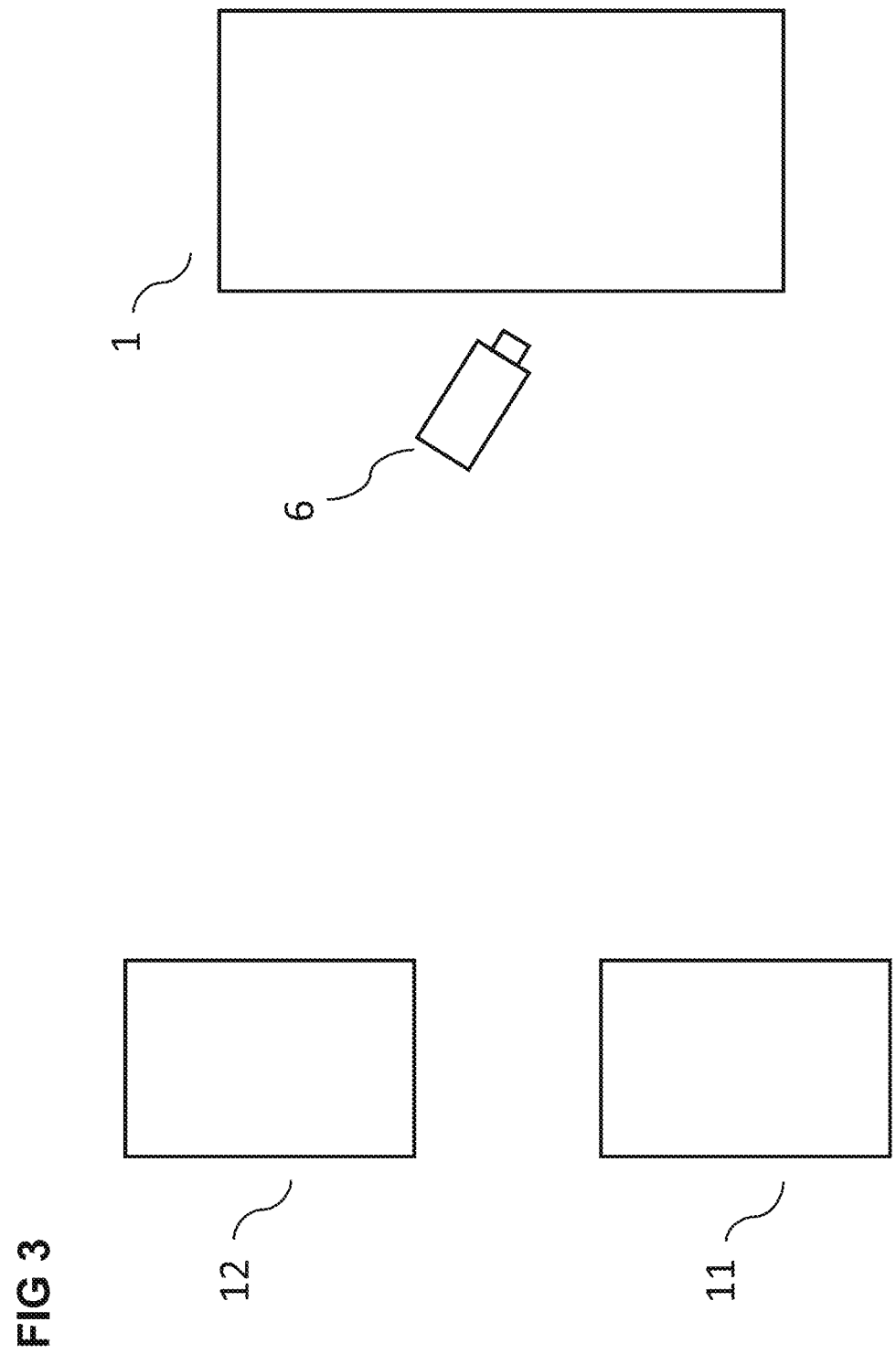
FIG. 3 shows another embodiment of a system for the identification of the formation of a burning droplet of a material of a fiber optic cable during cable burn testing comprising a computer to control a data processing device for processing an image stream of a burn process of a fiber optic cable.

Referring to FIG. 3, the system 100 may comprise a second data processing device 12 being configured as a computer to control the data processing device 11 for processing the image data of the plurality of image samples of the image stream. A control software installed and run on the second data processing device 12 may be used to remotely send commands to the video processing app executed by the data processing device 11. This software serves as the main interface between a user and a vision system, as the second data processing device/computer 12 that is running the video analysis will not necessarily be the same one that is used to oversee the burn test.

Regarding software architecture, the software system may be designed to run on a computer with a Windows 10 operating system that is preferably equipped with an 8th Gen Intel® Core i5 or better CPU and at least 8 GB of system memory. A gigabit ethernet connection is preferred for stable communication with the video cameras of the system, and remote data storage.

It should be noted that all roles of the data processing device 11 and the data processing device 12 may be performed on different hardware devices or on the same physical device, for example a computer device.

The embodiments of the system for the identification of the formation of a burning droplet of a material of a fiber optic cable during cable burn testing disclosed herein have been discussed for the purpose of familiarizing the reader with novel aspects of the design of the system. Although preferred embodiments have been shown and described, many changes, modifications, equivalents and substitutions of the disclosed concepts may be made by one having skill in the art without unnecessarily departing from the scope of the claims.

In particular, the design of the system for the identification of the formation of a burning droplet of a material of a fiber optic cable during cable burn testing is not limited to the disclosed embodiments, and gives examples of many alternatives as possible for the features included in the embodiments discussed. However, it is intended that any modifications, equivalents and substitutions of the disclosed concepts be included within the scope of the claims which are appended hereto.

Features recited in separate dependent claims may be advantageously combined. Moreover, reference signs used in the claims are not limited to be construed as limiting the scope of the claims.

Furthermore, as used herein, the term "comprising" does not exclude other elements. In addition, as used herein, the article "a" is intended to include one or more than one component or element, and is not limited to be construed as meaning only one.

What is claimed is:

1. A system for the identification of the formation of a burning droplet of a material of a fiber optic cable during cable burn testing, comprising:
   a data processing device for processing respective image data of a plurality of image samples of an image stream, the data processing device being configured to execute the following processing steps a) and b):
   a) preprocessing each of the recorded image samples of the image stream to generate a respective preprocessed image sample for each of the recorded image samples such that areas of the recorded image samples disturbing the identification of burning droplets are masked out in the respective preprocessed image sample,
   b) identifying a burning droplet in each of the preprocessed image samples by evaluating a pixel color property of a pixel of each preprocessed image sample.

2. The system of claim 1, further comprising:
a video camera for recording the image stream.

3. The system of claim 2, further comprising:
a burn chamber,
a supporting device to support the fiber optic cable, the supporting device being arranged in the burn chamber,
a burner being arranged in the burn chamber in a distance above a bottom of the chamber, the burner being configured to produce a flame which is suitable to ignite the fiber optic cable,
wherein the burn chamber has a window,
wherein the video camera is mounted on the burn chamber for recording the image stream showing the inside of the burn chamber.

4. The system of claim 3,
wherein the data processing device is configured to execute a step of cropping out a region located above the bottom of the burn chamber and below the burner in each of the recorded image samples for processing the image data of the cropped out region.

5. The system of claim 3,
wherein the data processing device is configured to execute a step of masking out a reflection in the recorded image samples, the reflection being caused at least by the flame of the burner or a reflective surface in the inside of the burn chamber.

6. The system of claim 1,
wherein the data processing device is configured to execute a processing step of evaluating each pixel of each preprocessed image sample of the image stream to determine if the evaluated pixel shows a part of the burning droplet.

7. The system of claim 6,
wherein the data processing device is configured to execute a processing step of assigning a respective flame rating value to each pixel.

8. The system of claim 7,
wherein the data processing device is configured to execute a step of classifying each pixel whose flame rating value exceeds a threshold as showing the part of the burning droplet.

9. The system of claim 1,
wherein the data processing device is configured to execute the step of evaluating each pixel of each preprocessed image sample by a processing step of creating an image for each preprocessed image sample, the created image being a grayscale mask.

10. The system of claim 1,
wherein the data processing device is configured to execute a step of grouping pixels by using a clustering algorithm.

11. The system of claim 10,
wherein the data processing device is configured to execute a step of determining a burning region in each preprocessed image sample based on the grouped pixels and tracking the burning regions.

12. The system of claim 11,
wherein the data processing device is configured to execute a processing step of tracking the burning droplet in the tracked burning regions.

13. The system of claim 12,
wherein the data processing device is configured to execute a processing step of measuring the time during which the burning droplet is tracked in the tracked burning regions.

14. The system of claim 13,
wherein the data processing device is configured to execute a processing step of attributing a class designation to the fiber optic cable in dependence on the measured time.

15. The system of claim 1, further comprising:
a second data processing device being configured as a computer to control the data processing device for processing the respective image data of the plurality of image samples of the image stream.

* * * * *